United States Patent
Zamanzadeh et al.

(10) Patent No.: US 11,666,005 B1
(45) Date of Patent: Jun. 6, 2023

(54) ELECTROCHEMICAL COLORING OF PLANTS

(71) Applicant: MATERGENICS, INC., Pittsburgh, PA (US)

(72) Inventors: Mehrooz Zamanzadeh, Pittsburgh, PA (US); Carolyn Tome, Pittsburgh, PA (US)

(73) Assignee: Matergenics, Inc., Pittsburgh, PA (US)

( * ) Notice: Subject to any disclaimer, the term of this patent is extended or adjusted under 35 U.S.C. 154(b) by 0 days.

(21) Appl. No.: 18/078,134

(22) Filed: Dec. 9, 2022

Related U.S. Application Data

(60) Provisional application No. 63/288,003, filed on Dec. 10, 2021.

(51) Int. Cl.
*A01G 7/04* (2006.01)

(52) U.S. Cl.
CPC ...................... *A01G 7/04* (2013.01)

(58) Field of Classification Search
CPC .................... A01G 7/04; A01G 9/26
See application file for complete search history.

(56) References Cited

U.S. PATENT DOCUMENTS

| | | | |
|---|---|---|---|
| 784,346 A | 3/1905 | Pilsoudsky et al. | |
| 882,699 A | 3/1908 | Latshaw | |
| 3,944,916 A | 3/1976 | Tillander | |
| 5,464,456 A * | 11/1995 | Kertz | A47G 7/02 47/60 |
| 8,474,183 B2 | 7/2013 | Krysiak et al. | |

FOREIGN PATENT DOCUMENTS

| | | | |
|---|---|---|---|
| CN | 104871845 A | 9/2015 | |
| RU | 2261588 C2 | 10/2005 | |
| WO | WO-9501090 A1 * | 1/1995 | ............... A01G 7/04 |

* cited by examiner

*Primary Examiner* — Monica L Perry
(74) *Attorney, Agent, or Firm* — Thomas M. Joseph

(57) ABSTRACT

A plant is in growth media having an aqueous solution having an electrolyte with a plurality of charged coloring agents therein. An electrochemical cell has a first electrode inserted into the growth media and a second electrode inserted into the plant with the first electrode being coupled to the second electrode to form a potential difference therebetween. The potential difference drives the plurality of charged coloring agents from the growth media into the plant to color the plant.

20 Claims, 3 Drawing Sheets

400

| 401 | SUBMERGE A FIRST ELECTRODE INTO GROWTH MEDIA HAVING A PLURALITY OF CHARGED COLORING AGENTS THEREIN |

| 402 | INSERT A SECOND ELECTRODE INTO A PLANT IN THE GROWTH MEDIA |

| 403 | COUPLE THE FIRST ELECTRODE TO THE SECOND ELECTRODE TO CREATE A POTENTIAL DIFFERENCE THEREBETWEEN TO DRIVE THE PLURALITY OF CHARGED COLORING AGENTS INTO THE PLANT TO COLOR THE PLANT |

FIG. 4

ELECTROCHEMICAL COLORING OF PLANTS

CROSS REFERENCE TO RELATED APPLICATION

This application claims the benefit under 35 U.S.C. § 119(e) of U.S. Provisional Application No. 63/288,003 entitled "ELECTROCHEMICAL COLORING OF PLANTS" filed Dec. 10, 2021, which is incorporated herein by reference.

BACKGROUND

The coloring of plants and their various parts, such as leaves, flowers, and fruits, is important for both functional and aesthetic reasons. Plant colors serve to attract insects, birds, and animals for both pollination and seed dispersal. In many cases, the color of a flower comes from reflected light from various chemical compounds called plant pigments.

There are three main groups of plant pigments, anthrocyanins, carotenoids, and betalains. Anthocyanins are a group of flavonoid chemicals (phenolic compounds) that are responsible for many colors, from orange and red to violet and blue. Carotenoids are terpenoid chemicals that are responsible for yellows, oranges, and reds. Betalains are less common in plants. Betalains are found, primarily, in c aryophyllales, which include *dianthus*, cacti, and beets.

Anthocyanins are composed of anthocyanidin chemicals to which sugars are attached. Delphinidin imparts the blue color to delphinium, as well as to violas and grapes producing Cabernet Sauvignon wine. Malvidin imparts blue to the flowers of some primroses, is the main pigment in red wines, is found in perennial geraniums and petunias, and of course is in mallows (*Malva*). Pelargonidin is of course in the red annual geranium (*Pelargonium*), as well as in many red fruits from strawberries to raspberries and cranberries. Purplish-red colors in peonies are from peonidin.

Carotenoids can cause carrots to be yellow and orange and can cause tomatoes to be red. The two main groups of carotenoids are xanthophylls and carotenes. The latter are what make cantaloupes and carrots orange. The carotenoid in most red tomatoes is lycopene.

Other factors can affect the color of plants. Temperature affects color, hence, there are often more vivid colors in cool northern gardens than hot summer ones. Plant stress, such as from drought, insect attack, or plant nutrition (too much or little) also can cause different levels of pigments in flowers, and as a result, different colors.

Dyes and other coloring agents have been used in various experiments on plants. One such type of experiment involves the use of dye that can be absorbed through capillary action in which water is taken up through plant roots from the soil. In such experiments, dye is placed in the surrounding soil for absorption into the plant. Then, the plant is dissected, so that the amount of absorbed dye can measured. Through such experiments, it has been determined that some dyes will not adversely affect plant growth.

Additionally, electric fields constitutes external stimuli that can affect plants because plants include many types of polymers and polymer networks. Changes in polymer network structure as a result of electrical field application are well known. High-intensity electrical field pulses and their effects on dehydration characteristics and rehydration properties of potato cubes and other vegetables are known.

As indicated above, color is an important aesthetic and functional characteristic of many plants. Accordingly, an improved system for coloring plants is needed.

SUMMARY

The following summary is provided to introduce a selection of concepts in a simplified form that are further described below in the detailed description. This summary is not intended to identify key features or essential features of the claimed subject matter, nor is it intended to be used to limit the scope of the claimed subject matter.

In various implementations, an electrochemical system is set up to color a plant in growth media having an aqueous solution. The aqueous solutions comprise an electrolyte with a plurality of charged coloring agents therein. An electrochemical cell has a first electrode inserted into the growth media and a second electrode inserted into the plant, wherein the first electrode being coupled to the second electrode to form a potential difference therebetween. The potential difference drives the plurality of charged coloring agents from the growth media into the plant to color the plant.

In other implementations, a method for coloring a plant in growth media including a solution having a plurality of charged coloring agents therein is provided. A first electrode is submerged into the growth media. A second electrode is inserted into the plant. The first electrode is coupled to the second electrode to create a potential difference therebetween to drive the plurality of charged coloring agents into the plant to color the plant.

In yet other implementations, a kit for coloring a plant in growth media including a solution having a plurality of charged coloring agents therein. An electrochemical cell has a first electrode for inserting into the growth media and a second electrode for inserting into the plant, wherein the first electrode being coupled to the second electrode to form a potential difference therebetween. The potential difference can drive the plurality of charged coloring agents from the growth media into the plant to color the plant.

These and other features and advantages will be apparent from a reading of the following detailed description and a review of the appended drawings. It is to be understood that the foregoing summary, the following detailed description and the appended drawings are explanatory only and are not restrictive of various aspects as claimed.

BRIEF DESCRIPTION OF THE DRAWINGS

FIG. 4 is an exemplary process in accordance with the disclosed subject matter.

DETAILED DESCRIPTION

Figure 1:
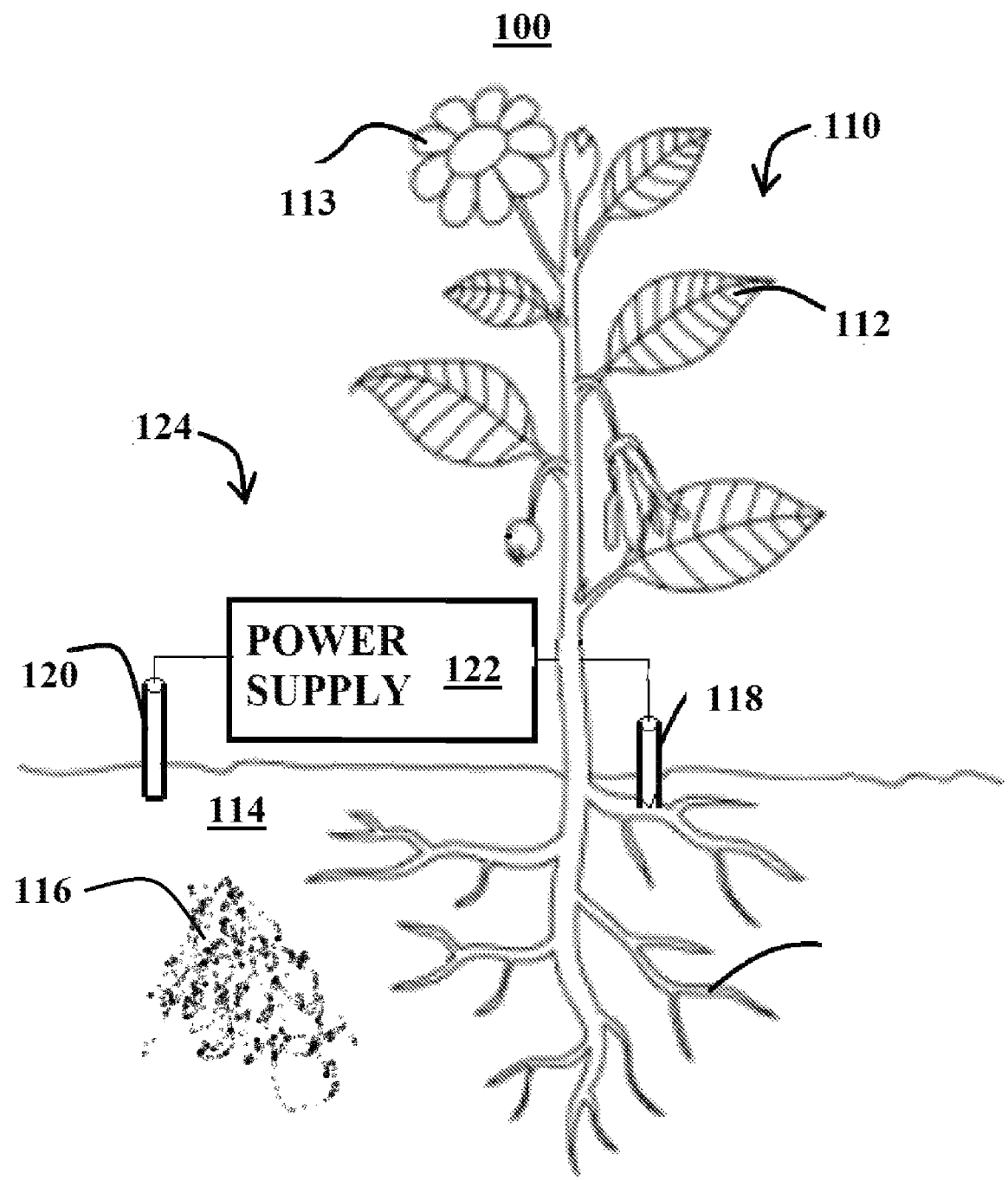
FIG. 1 is a schematic diagram of a system for coloring plants in accordance with the disclosed subject matter.

The subject disclosure is directed to systems, methods, and apparatus for coloring plants electrochemically. More specifically, the subject disclosure is directed to the establishment of an electrochemical cell through the insertion of one electrode into a plant and another electrode into soil in fluid communication with the plant. The soil can contain various type of charged coloring agents, so that a potential difference can be established between the electrodes to drive the charged coloring agents into the plant from the soil.

The detailed description provided below in connection with the appended drawings is intended as a description of examples and is not intended to represent the only forms in which the present examples can be constructed or utilized. The description sets forth functions of the examples and sequences of steps for constructing and operating the examples. However, the same or equivalent functions and sequences can be accomplished by different examples.

References to "one embodiment," "an embodiment," "an example embodiment," "one implementation," "an implementation," "one example," "an example" and the like, indicate that the described embodiment, implementation or example can include a particular feature, structure or characteristic, but every embodiment, implementation or example can not necessarily include the particular feature, structure or characteristic. Moreover, such phrases are not necessarily referring to the same embodiment, implementation or example. Further, when a particular feature, structure or characteristic is described in connection with an embodiment, implementation or example, it is to be appreciated that such feature, structure or characteristic can be implemented in connection with other embodiments, implementations or examples whether or not explicitly described.

Numerous specific details are set forth in order to provide a thorough understanding of one or more embodiments of the described subject matter. It is to be appreciated, however, that such embodiments can be practiced without these specific details.

Various features of the subject disclosure are now described in more detail with reference to the drawings, wherein like numerals generally refer to like or corresponding elements throughout. The drawings and detailed description are not intended to limit the claimed subject matter to the particular form described. Rather, the intention is to cover all modifications, equivalents and alternatives falling within the spirit and scope of the claimed subject matter.

It is known that coloring agents, such as colorants, color additives, dyes, and pigments, can color various materials, including organisms such as plants. The coloring process of plants can be improved through the use of an electrochemical cell that can drive charged coloring agents that are present in growth media, such as soil, into plants. The electrochemical cell can be formed by inserting one electrode into a plant and a second electrode that is in fluid contact with the soil. The potential difference between the electrodes can drive the charged coloring agents from the soil into the plant to color the plant.

Referring now to FIG. 1, there is shown a system, generally designated by the numeral 100, for coloring a plant 110 or portions of the plant 110, such as leaves 112 and flowers 113. The plant 110 can be growing in growth media 114 that includes electrolytes having charged coloring agents 116 therein. The system 100 can include a pair of electrodes 118-120 and, optionally, a power supply 122. In a preferred embodiment, the power supply 122 is a battery. The system 100 can be provided in an assembled form or as a kit for assembly to farmers, gardeners, and other people with interest in either home agriculture or industrial agriculture.

The system 100 comprises an electrochemical cell 124 having a first electrode 118 and a second electrode 120. The first electrode 118 is inserted into the plant 110 and the second electrode 120 is inserted into the growth media 114. In some embodiments, the first electrode 118 can form an active alloy anode with the second electrode 120 forming a passive alloy cathode. In other embodiments, the first electrode 118 can form a passive alloy cathode while the second electrode 120 can form a corresponding active alloy anode.

The positioning of the electrodes 118-120 will depend upon charge on the charged coloring agents 116. In embodiments in which the charged coloring agents 116 have a negative charge, the first electrode 118 will be an anode. In embodiments in which the charged coloring agents 116 have a positive charge, the first electrode 118 will be a cathode. In embodiments that use polarized charged coloring agents 116, such as zwitterionic coloring agents, the first electrode 118 can function as either an anode or a cathode.

Accordingly, the second electrode 120 can function to correspond to the positioning of the first electrode 118. In the embodiment where the first electrode 118 is an anode, the second electrode 120 can be a cathode. In the other embodiment where the first electrode 119 is a cathode, the second electrode 120 can be an anode.

The terms "active alloy" and "passive alloy" should be understood in relation to one another, such that the active alloy is higher on a galvanic series for a given growth media than the passive alloy. The relationship of the active alloy to the passive alloy on the galvanic series can create a potential difference between an active alloy anode and a passive alloy cathode when the electrodes are placed, at least partially, in the plant 110 and the growth media 114.

The active alloy anode and the passive alloy cathode can form the electrochemical cell 124 in some embodiments because the growth media 114 includes an aqueous solution that includes the charged coloring agents 116. In other embodiments, the power supply 122 can create or enhance the potential difference between the electrodes 118-120.

The charged coloring agents 116 can be placed into the growth media 114 in a charged state or can be charged therein. In the exemplary embodiment, the growth media 114 includes soil. In other embodiments, the growth media 114 can include clays or can be liquid media, such as a hydroponic growth medium.

The plant 110 can be any suitable plant for coloring, such as plants that produce fruits, vegetables, medicinal plant products, crops, and/or other useful plant products. In this exemplary embodiment, the plant 110 can be a flowing plant, a fruit plant, or a vegetable plant. Additionally, the plant 110 can be an edible plant or a non-edible plant.

The aqueous component of the growth media 114 can be any suitable aqueous solution. The aqueous solution can be an alkaline solution, an acid solution, or another water-based solution. Other suitable aqueous solutions can include potable water and low conductivity water.

The charged coloring agents 116 can be any suitable coloring agent that can be moved by an electric field within a liquid solution, emulsion, colloidal suspension, or other similar system. Suitable charged coloring agents include compounds that include colorants, color additives, dyes, pigments, or combinations thereof.

In some embodiments, the charged coloring agents 116 can be food coloring to enhance edible properties of the plant 110. Additionally, the charged coloring agents 116 can include, such as anions, cations, and polarized zwitterions.

The charged coloring agents 116 can be non-toxic. In some embodiments, non-toxic should be understood to contain less than 50% of toxic materials or substances. Toxic materials include substances that produce personal injury or illness to humans when inhaled, swallowed, or absorbed through the skin. Additionally, toxic materials can cause long-term chronic effects like cancer, birth defects, or neurotoxicity.

The charged coloring agents 116 can include little or no corrosive components or irritants. Corrosive components include components that destroy living tissue such as skin or eyes by chemical action. Irritants can be corrosive and cause a substantial injury to the area of the body within which it contacts. Irritation can occur after immediate, prolonged, or repeated contact.

The charged coloring agents 116 can be environmentally friendly, non-poisonous, and edible. Edible substances are substances that are safe for humans to eat.

The geometric configuration of the electrochemical cell can be modified to adapt the specific needs by users with ordinary skills in the art. Such users would understand that the electrodes 118-120 can have any suitable geometric configuration. The electrodes 118-120 can be in the form of wire, mesh, foil, an ingot, sheet or wire. The construction and allocation of the first electrode 118 and second electrode 120 are modifiable and adaptable based on the condition of each application.

Figure 2:
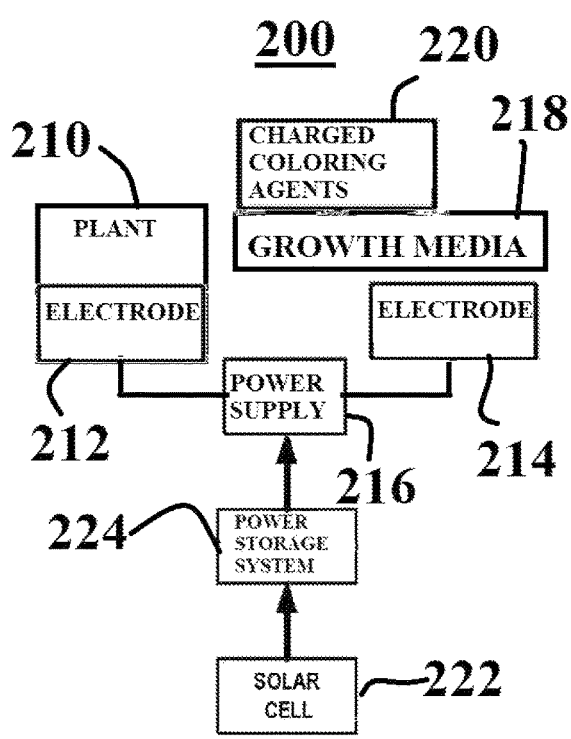
FIG. 2 is a block diagram of another embodiment of a system for coloring plants in accordance with the disclosed subject matter.

Referring now to FIG. 2 with continuing reference to the foregoing figure, another embodiment of a system, generally designated by the numeral 200, for coloring a plant 210 is shown. Like the embodiment shown in FIG. 1, the system 200 includes a pair of electrodes 212-214, a power supply 216, growth media 218, and charged coloring agents 220 in the growth media 218. The first electrode 212 is inserted into the plant 210, and the second electrode 214 is inserted into the growth media 218. The first electrode 212 can take on the role of an anode while the second electrode 214 can take on the role of a cathode, correspondingly. Vice versa, the first electrode 212 can take on the role of a cathode while the second electrode 214 can take on the role of an anode.

The potential difference between the first electrode 212 and the second electrode 214 can form an electrochemical cell, as the growth media 218 can include aqueous solutions. The potential difference in this embodiment can be created or enhanced through the power supply 216.

In this exemplary embodiment, the power supply 216 can receive power from a solar cell 222. The solar cell 222 can connect to a power storage system 224 that can include one or more devices for storing power when the solar cell 222 cannot convert a sufficient amount of solar energy into electricity to power the system 200.

Figure 3:
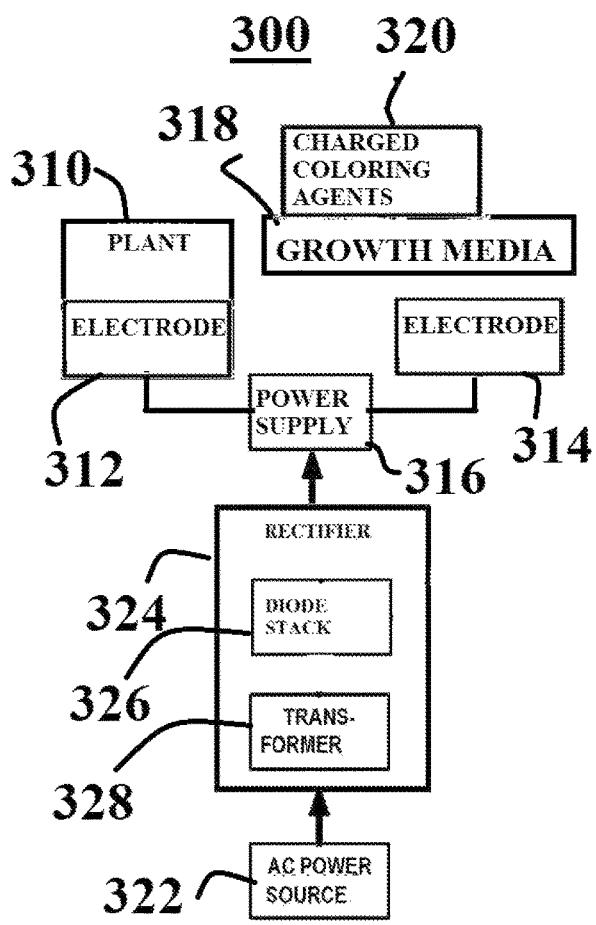
FIG. 3 is a block diagram of another embodiment of a system for coloring plants in accordance with the disclosed subject matter.

Referring now to FIG. 3 with continuing reference to the foregoing figures, another embodiment of a system, generally designated by the numeral 300, for coloring a plant 310 is shown. In this exemplary embodiment, the system 300 includes a pair of electrodes 312-314, a power supply 316, growth media 318, and charged coloring agents 320 in the growth media 318.

The first electrode 312 is inserted into the plant 310, and the second electrode 314 is inserted into the growth media 318. The first electrode 312 can take on the role of an anode while the second electrode 314 can take on the role of a cathode, correspondingly. Vice versa, the first electrode 312 can take on the role of a cathode while the second electrode 314 can take on the role of an anode.

The potential difference between the first electrode 312 and the second electrode 314 can form an electrochemical cell, as the growth media 318 can include aqueous solutions. The potential difference in this embodiment can be created or enhanced through the power supply 316.

In this exemplary embodiment, the power supply 316 can receive power from an AC power source 322. The AC power source 322 can send power to the power supply 316 through a rectifier 324 that includes a diode stack 326 and a transformer 328.

Referring now to FIG. 4 with continuing reference to the foregoing figures, an exemplary method, generally designated with the numeral 400, for coloring plants within growth media is shown. The method 400 can be performed using the system 100 shown in FIG. 1, the system 200 shown in FIG. 2, and/or the system 300 shown in FIG. 3. The growth media includes charged coloring agents.

At 401, a first electrode is submerged into growth media. In this exemplary embodiment, the first electrode can be the electrode 118 in FIG. 1, the electrode 212 in FIG. 2, and/or the electrode 312 in FIG. 3. The growth media can be the growth media 114 shown in FIG. 1, the growth media 218 shown in FIG. 2, the growth media 318 shown in FIG. 3.

At 402, a second electrode into is inserted into a plant. In this exemplary embodiment, the second electrode can be the electrode 120 in FIG. 1, the electrode 214 in FIG. 2, and/or the electrode 314 in FIG. 3. The plant can be the plant 110 shown in FIG. 1, the plant 210 shown in FIG. 2, and/or the plant 310 shown in FIG. 3.

At 403, the first electrode is coupled to the second electrode to create a potential difference therebetween to drive a plurality of charged coloring agents into the plant to color the plant. In this exemplary embodiment, the charged coloring agents can be the charged coloring agents 116 shown in FIG. 1, the charged coloring agents 220 shown in FIG. 2, and/or the charged coloring agents 320 shown in FIG. 3.

As demonstrated in FIG. 2 and FIG. 3, 403 can be modified and adapted for specific needs of each application. In some embodiments, the electrochemical plant coloring system would utilize a power source to create or enhance the power potential difference between the first electrode and the second electrode. The orientation of the first electrode and the second electrode in relation to the growth medium can create an electrochemical cell, as shown in FIG. 1, which can further be supplemented with a power source. The electrochemical cell can be supplemented by a solar power source as in FIG. 2, such that the solar cell 222 collects and generates power to be stored in power storage system 224. In the situation the electrochemical cell requires additional power supply to enhance the potential in order to drive the charged coloring agents from the growth medium to the plant, the power source can provide the boost to the power supply 216. In other embodiments, such as demonstrated in FIG. 3, an AC power source 322 can be provided along with the rectifier 324 to boost the power supply 316. It is understood that a person with ordinary skills in the art would be able to modify the design and configuration for the power supply to better suit the need to each application that utilizes the present system. It is foreseeable that other power supply sources can be utilized to create or enhance the power potential difference between the first electrode and the second electrode, such the charged coloring agents can be driven from the growth medium to the plant.

Supported Features and Embodiments

The detailed description provided above in connection with the appended drawings explicitly describes and supports various features of apparatus and methods for the electrochemical coloring of plants. By way of illustration and not limitation, supported embodiments include an electrochemical system for coloring a plant in growth media, wherein the growth media includes an aqueous solution having an electrolyte with a plurality of charged coloring agents therein, the electrochemical system comprising: an electrochemical cell having a first electrode inserted into the growth media and a second electrode inserted into the plant with the first electrode being coupled to the second electrode to form a potential difference therebetween, wherein the potential difference drives the plurality of charged coloring agents from the growth media into the plant to color the plant.

Supported embodiments include the forgoing electrochemical system, wherein each of the plurality of charged coloring agents includes a compound selected from the group consisting of a colorant, a color additive, a dye, and a pigment.

Supported embodiments include any of the forgoing electrochemical systems, wherein the plurality of charged coloring agents includes food coloring.

Supported embodiments include any of the forgoing electrochemical systems, wherein the plurality of charged coloring agents includes ions selected from the group consisting of anions, cations, and polarized zwitterions.

Supported embodiments include any of the forgoing electrochemical systems, wherein the plurality of charged coloring agents includes anions and the second electrode is an anode.

Supported embodiments include any of the forgoing electrochemical systems, wherein the plurality of charged coloring agents includes cations and the second electrode is a cathode.

Supported embodiments include any of the forgoing electrochemical systems, wherein the growth media is growth media selected from the group consisting of soil, clay, and water.

Supported embodiments include any of the forgoing electrochemical systems, wherein the electrochemical cell is a galvanic cell.

Supported embodiments include any of the forgoing electrochemical systems, further comprising: a DC power source connecting to first electrode to the second electrode to impress a potential difference therebetween.

Supported embodiments include any of the forgoing electrochemical systems, wherein the DC power source is a solar cell.

Supported embodiments include any of the forgoing electrochemical systems, wherein the DC power source includes an AC power source and a transformer.

Supported embodiments include a method for coloring a plant in growth media, wherein the growth media includes a solution having a plurality of charged coloring agents therein, the method comprising: submerging a first electrode into the growth media, inserting a second electrode into the plant, and coupling the first electrode to the second electrode to create a potential difference therebetween to drive the plurality of charged coloring agents into the plant to color the plant.

Supported embodiments include the foregoing method, wherein each of the plurality of charged coloring agents includes a compound selected from the group consisting of a colorant, a color additive, a dye, and a pigment.

Supported embodiments include any of the foregoing methods, wherein the plurality of charged coloring agents includes food coloring.

Supported embodiments include any of the foregoing methods, wherein the plurality of charged coloring agents includes ions selected from the group consisting of anions, cations, and polarized zwitterions.

Supported embodiments include any of the foregoing methods, wherein the plurality of charged coloring agents includes anions and the second electrode is an anode.

Supported embodiments include any of the foregoing methods, wherein the plurality of charged coloring agents includes cations and the second electrode is a cathode.

Supported embodiments include any of the foregoing methods, wherein the growth media is growth media selected from the group consisting of soil, clay, and water Supported embodiments include any of the foregoing methods, further comprising: coupling a power source to first electrode and the second electrode to create the potential difference therebetween.

Supported embodiments include a kit for coloring a plant in growth media, wherein the growth media includes a solution having a plurality of charged coloring agents therein, the kit comprising: an electrochemical cell having a first electrode for inserting into the growth media and a second electrode for inserting into the plant with the first electrode being coupled to the second electrode to form a potential difference therebetween, wherein the potential difference can drive the plurality of charged coloring agents from the growth media into the plant to color the plant.

Supported embodiments include an apparatus, a method, a system, a kit and/or means for implementing any of the foregoing embodiments or portions thereof.

Supported embodiments can provide various attendant and/or technical advantages in terms of a simple, low cost instrumentality to color plants using natural galvanic currents and/or impressed currents.

Supported embodiments include a system that can move charged coloring agents within a growth media into plants to color the plants.

The detailed description provided above in connection with the appended drawings is intended as a description of examples and is not intended to represent the only forms in which the present examples can be constructed or utilized.

It is to be understood that the configurations and/or approaches described herein are exemplary in nature, and that the described embodiments, implementations and/or examples are not to be considered in a limiting sense, because numerous variations are possible.

The specific processes or methods described herein can represent one or more of any number of processing strategies. As such, various operations illustrated and/or described can be performed in the sequence illustrated and/or described, in other sequences, in parallel, or omitted. Likewise, the order of the above-described processes can be changed.

Although the subject matter has been described in language specific to structural features and/or methodological acts, it is to be understood that the subject matter defined in the appended claims is not necessarily limited to the specific features or acts described above. Rather, the specific features and acts described above are presented as example forms of implementing the claims.

What is claimed is:

1. An electrochemical system for coloring a plant in growth media,
   wherein the growth media includes an aqueous solution having an electrolyte with a plurality of charged coloring agents therein, the electrochemical system comprising:
   an electrochemical cell having a first electrode inserted into the growth media and a second electrode inserted into the plant with the first electrode being coupled to the second electrode to form a potential difference therebetween,
wherein the potential difference drives the plurality of charged coloring agents from the growth media into the plant to color the plant.

2. The electrochemical system of claim 1, wherein each of the plurality of charged coloring agents includes a compound selected from the group consisting of a colorant, a color additive, a dye, and a pigment.

3. The electrochemical system of claim 1, wherein the plurality of charged coloring agents includes food coloring.

4. The electrochemical system of claim 1, wherein the plurality of charged coloring agents includes ions selected from the group consisting of anions, cations, and polarized zwitterions.

5. The electrochemical system of claim 4, wherein the plurality of charged coloring agents includes anions and the second electrode is an anode.

6. The electrochemical system of claim 4, wherein the plurality of charged coloring agents includes cations and the second electrode is a cathode.

7. The electrochemical system of claim 1, wherein the growth media is growth media selected from the group consisting of soil, clay, and water.

8. The electrochemical system of claim 1, wherein the electrochemical cell is a galvanic cell.

9. The electrochemical system of claim 1, further comprising:
a DC power source connecting to first electrode to the second electrode to impress a potential difference therebetween.

10. The electrochemical system of claim 9, wherein the DC power source is a solar cell.

11. The electrochemical system of claim 9, wherein the DC power source includes an AC power source and a transformer.

12. A method for coloring a plant in growth media,
wherein the growth media includes a solution having a plurality of charged coloring agents therein, the method comprising:
submerging a first electrode into the growth media,
inserting a second electrode into the plant, and
coupling the first electrode to the second electrode to create a potential difference therebetween to drive the plurality of charged coloring agents into the plant to color the plant.

13. The method of claim 12, wherein each of the plurality of charged coloring agents includes a compound selected from the group consisting of a colorant, a color additive, a dye, and a pigment.

14. The method of claim 12, wherein the plurality of charged coloring agents includes food coloring.

15. The method of claim 12, wherein the plurality of charged coloring agents includes ions selected from the group consisting of anions, cations, and polarized zwitterions.

16. The method of claim 15, wherein the plurality of charged coloring agents includes anions and the second electrode is an anode.

17. The method of claim 15, wherein the plurality of charged coloring agents includes cations and the second electrode is a cathode.

18. The method of claim 12, wherein the growth media is growth media selected from the group consisting of soil, clay, and water.

19. The method of claim 12, further comprising:
coupling a power source to first electrode and the second electrode to create the potential difference therebetween.

20. A kit for coloring a plant in growth media,
wherein the growth media includes a solution having a plurality of charged coloring agents therein, the kit comprising:
an electrochemical cell having a first electrode for inserting into the growth media and a second electrode for inserting into the plant with the first electrode being coupled to the second electrode to form a potential difference therebetween,
wherein the potential difference can drive the plurality of charged coloring agents from the growth media into the plant to color the plant.

* * * * *